Figure 1:
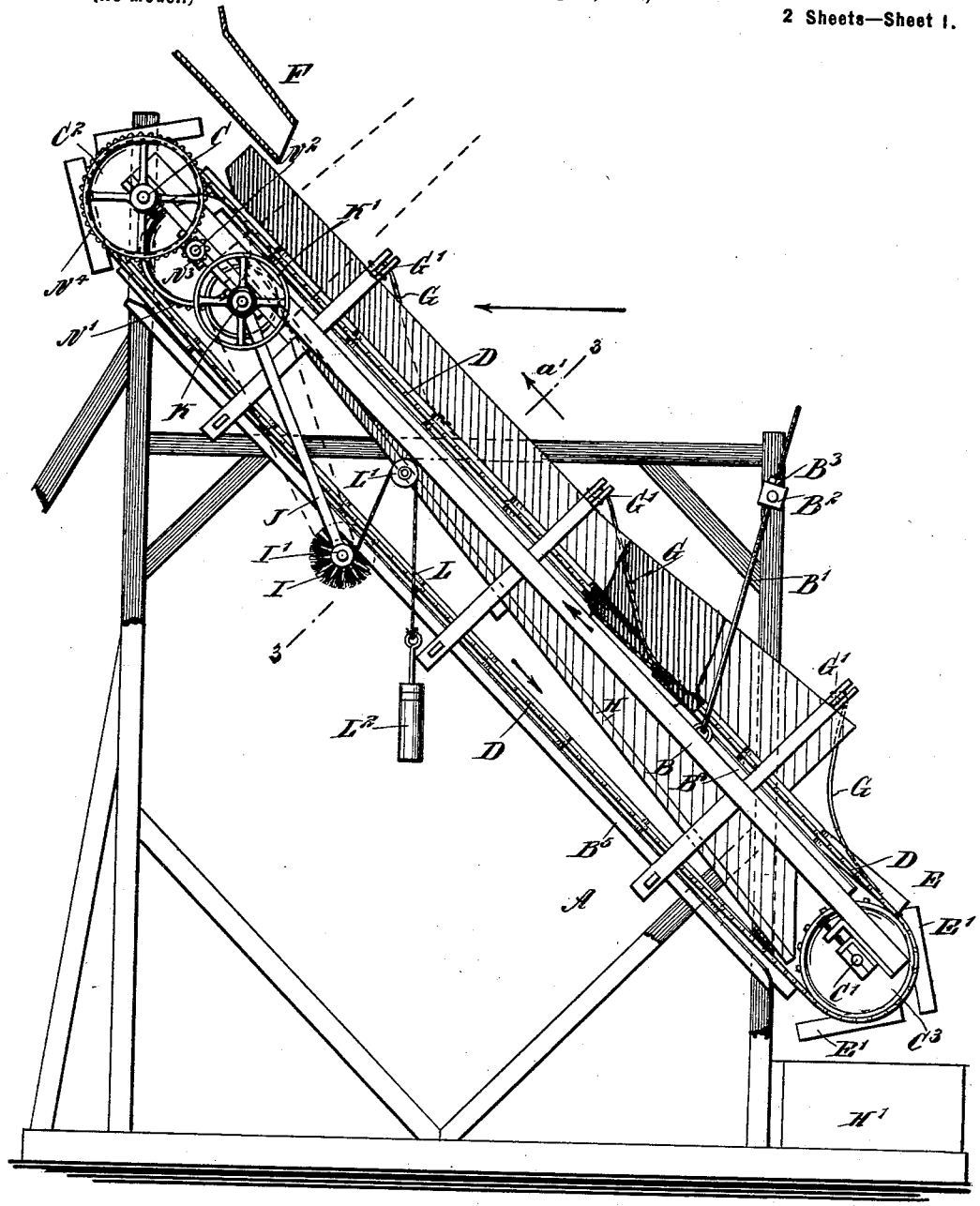

No. 625,295. Patented May 16, 1899.
J. M. ELDER & O. W. DUNLAP.
SCREENING MACHINE.
(Application filed Aug. 20, 1898.)
(No Model.) 2 Sheets—Sheet 2.
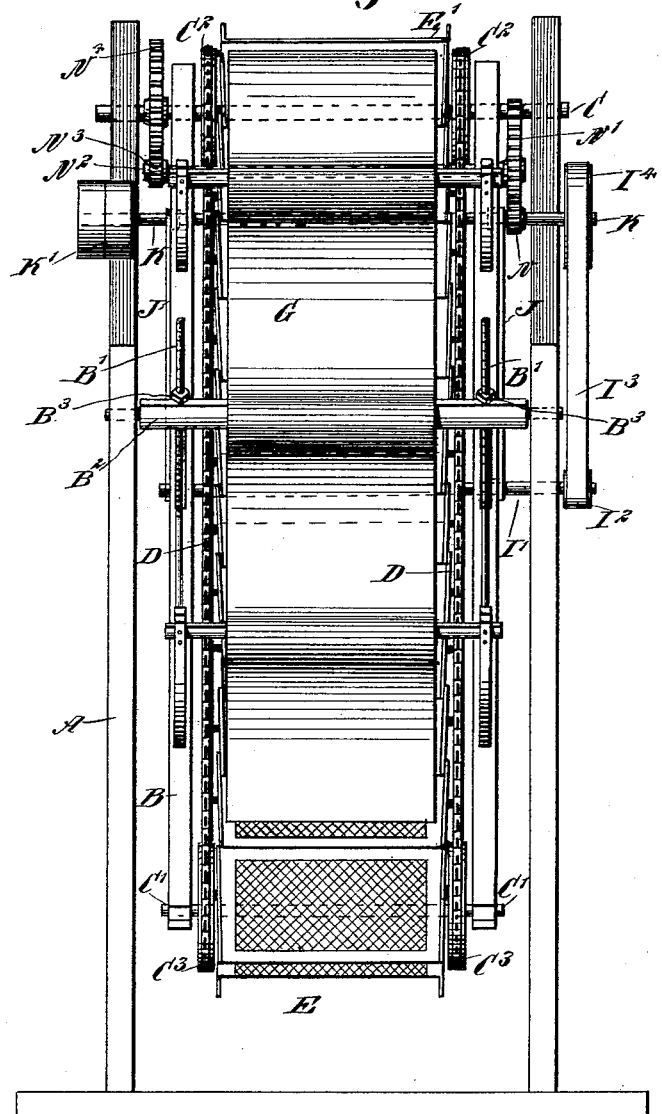
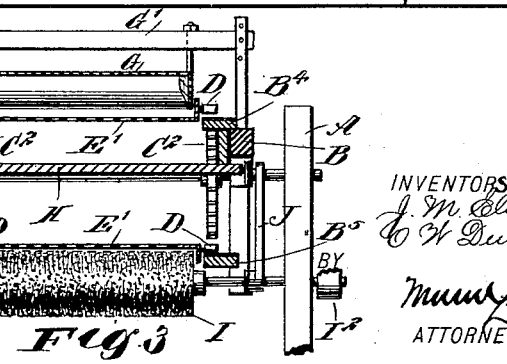

UNITED STATES PATENT OFFICE.

JOSEPH MILTON ELDER AND OLIVER WALDRON DUNLAP, OF BLOOMINGTON, ILLINOIS.

SCREENING-MACHINE.

SPECIFICATION forming part of Letters Patent No. 625,295, dated May 16, 1899.

Application filed August 20, 1898. Serial No. 689,085. (No model.)

*To all whom it may concern:*

Be it known that we, JOSEPH MILTON ELDER and OLIVER WALDRON DUNLAP, of Bloomington, in the county of McLean and State of Illinois, have invented a new and Improved Screening-Machine, of which the following is a full, clear, and exact description.

The object of the invention is to provide a new and improved screening-machine, more especially designed for screening moist and sticky clay used in the manufacture of bricks and the like, the machine being simple and durable in construction, very effective in operation, and arranged to keep the screening-plates perfectly clean and insure proper screening at all times.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement with parts broken out. Fig. 2 is a front elevation of the same, and Fig. 3 is a transverse section of the improvement on the line 3 3 in Fig. 1.

Screening clay has been one of the most difficult tasks with which clay-workers have had to contend. Practical knowledge teaches that the preparation of the clay has its effect on the finished product, and in the preparation of clay that necessitates fineness, such as fire-clay and shale, the screen is a most important factor. From actual demonstrations it is known that the finer the clay is reduced the more assistance is given to the machinery that receives the clay and forms it into different shapes of the finished product. Another item, which is an important one in the manufacture of clayware, is the fuel, and it is evident that the finer and closer the bond can be produced in the mechanical part of the product the more solid and compact the body is maintained in the process of burning with a great saving of fuel and also with less waste from coarse, porous, and improperly-made ware.

In order to screen the clay to a desired fineness, the machine presently to be described in detail is provided.

On a suitably-constructed framework A is held an inclined screening-frame B, provided at its upper end with journals for a transverse shaft C, also journaled in the framework A to permit of swinging the screen-frame B into any desired inclination, the lower end of the screen-frame being supported by screw-rods B', passing through a transverse bar $B^2$, pivoted in the framework A. Nuts $B^3$ screw on the screw-rods B' and rest on the top of the transverse bar $B^2$, said nuts serving to screw up or let down the screw-rods to give the desired inclination to the screen-frame B. In the lower end of the screen-frame B is journaled a shaft C', and on the shafts C and C' are secured sprocket-wheels $C^2$ and $C^3$, respectively, over which pass sprocket-chains D, supporting and carrying a continuous or endless screen made of screen plates or sections E', having proper perforations and preferably made of sheet-steel, one section overlapping the other during the time they pass from one sprocket-wheel to the other. Each screen-plate is hung at its upturned sides on the sprocket-chains, so that when a section passes around a sprocket-wheel it readily becomes detached from the adjacent ones, as will be readily understood by reference to Fig. 1. The sprocket-chains D, and consequently the continuous screen E, travel in the direction of the arrow $a'$, and the material to be screened is passed upon the screen near the upper end of the upper run through a chute F to descend on the screen by gravity. The material to be screened thus descends toward the lower end of the upper run of the screen E, and during this downward travel, with the screen E traveling upward, the material to be screened is held in check with a series of aprons G, supported at the upper end by cross-bars G', and the lower end is allowed to lie flat and spread out over the screen E. By this arrangement the clay is kept in contact during its downward travel with the perforated screen plates or sections traveling upward, the clay being spread out thin before its discharge upon the screen proper. The apron holds the clay in check, and as the screen plates or sections travel upward and the clay has a tendency to travel downward by its own gravity it is evident that the clay is subjected to a sifting operation, whereby each particle is compelled to come in contact with the perforated screen-plates before it reaches the lower end of the screen, thus giving the clay the benefit of the full size of the perforations over the entire screening-surface, allowing nothing but the particles that are too coarse to go through the perforations to go over with the tailings at the lower end of the upper run of the screen.

The clay that is sifted through the perforations by the action of the apron G above described falls upon a chute H, carried by the screen-frame B, and having a greater inclination than the screen itself. The lower end of this chute H discharges the screened material beneath the lower sprocket-wheel $C^3$ at the point where the screen plates or sections E′ become detached from each other, and sufficient space is left between adjacent screen-plates for the material to drop down from the chute H into a bin or box H′, arranged below.

In order to keep the perforations in the screen-plates open and to keep the latter perfectly clean, a revoluble brush I is provided, having its shaft I′ journaled in suitable bearings in arms J, hung loosely on the driving-shaft K of the machine, the said driving-shaft being journaled in suitable bearings carried by the screen-frame B. The arms J are engaged at their free ends by a rope or chain L, extending upwardly over a pulley L′, and thence extending downward and carrying at its lower end a weight $L^2$ for pressing the brush I with the desired force in contact with the screen plates or sections at the time they are in the lower run of the screen. The screen-sections are guided during their travel in the upper and lower runs of the screen by guide-bars $B^4$ and $B^5$, forming parts of the screen-frame B. The driving-shaft K is provided with suitable fast and loose pulleys K′, connected by a belt with other machinery for imparting a rotary motion to the shaft K. On the shaft K is secured a pinion N in mesh with a gear-wheel N′, secured on a transverse shaft $N^2$, journaled in suitable bearings on the screen-frame B and carrying a pinion $N^3$ in mesh with a gear-wheel $N^4$, fastened to the shaft C. Now it is evident that when the shaft K is rotated a rotary motion is transmitted by the gearing described to the shaft C and the sprocket-wheels $C^2$ thereof to impart a traveling motion to the screen E in the direction of the arrow a′. The brush I is also driven from the shaft K, and for this purpose the shaft I′ is provided with a pulley $I^2$, over which passes a belt $I^3$, also passing over a pulley $I^4$, secured to the main driving-shaft K. Thus when the shaft K is started and the screen is traveling, then the brush I is rotated and held in contact with the screen-plates during the passage of the plates in the lower run of the screen. As the screen-sections at the lower run of the screen are traveling from the top of the machine downward and the brush is running in the opposite direction, the plates being upside down are exactly in the reverse position from that in which they are while on the screening-surface, and not being in use long enough to become clogged the brush positively and thoroughly removes each and every particle that sticks to the sections or gets wedged into the perforations, thus giving a clean bright surface to the screen-sections and keeping the perforations open.

Having thus fully described our invention, we claim as new and desire to secure by Letters Patent—

1. A clay-screening machine, consisting of a supporting-frame, an inclined screen-frame in the supporting-frame and having its upper end pivoted and its lower end adjustably supported, sprocket-wheels mounted in each end of the frame, an endless screen, comprising sprocket-chains, and screen-sections pivoted to the sprocket-chains to overlap each other when in the upper and lower runs, aprons secured to cross-bars of the supporting-frame and resting upon the screen, said aprons extending in a direction opposite to the travel of the screen, a chute below the upper run of the screen and having a greater inclination than the screen-frame, and a yieldingly-supported brush below the lower run of the screen and revolving in a reverse direction thereto, substantially as described.

2. A clay-screening machine, comprising a supporting-frame, an inclined frame adjustably held in the supporting-frame, an endless screen carried by the inclined frame and formed of a series of pivoted sections, a discharge-chute between the runs of the screen, an apron above the upper run of the screen and resting thereon, said apron extending in a direction opposite to the travel of the screen, and a brush yieldingly held against the lower run of the screen, substantially as described.

3. A clay-screening machine, comprising an inclined frame, a screen consisting of a series of pivoted sections, means for moving said screen around the frame, a discharge-chute underneath the upper stretch of the screen, an apron supported loosely above said upper stretch of the screen, a rotary brush held yieldingly against the lower stretch of the screen, and means for rotating said brush, substantially as shown and described.

4. In a clay-screening machine, the combination with a supporting-frame, of an inclined frame in the supporting-frame, an endless screen mounted in the inclined frame and composed of pivoted sections, means for imparting an upward traveling motion to the said screen, and a discharge-chute arranged between the runs of the screen and having its lower end terminating adjacent to the lower screen-carrying wheels, whereby the screened material will be discharged between the sections of the screen, as set forth.

5. In a clay-screening machine, the combination with a supporting-frame and a shaft mounted in the upper part of the said frame, of a screen-frame pivoted on said shaft, means for adjustably supporting the lower end of the screen-frame, a shaft mounted in the lower end of the screen-frame, sprocket-wheels on the said shafts, chains passing over said sprocket-wheels, an endless screen formed of sections secured to the said chains, a drive-shaft, and gearing between the drive-shaft and the shaft journaled in the supporting-frame, substantially as described.

JOSEPH MILTON ELDER.
OLIVER WALDRON DUNLAP.

Witnesses:
HOWARD E. SEARCH,
LEWIS WELLING.